United States Patent [19]
Siddiqui

[11] Patent Number: 5,738,373
[45] Date of Patent: Apr. 14, 1998

[54] GAS INFLATOR WITH CERAMIC FOAM BALLS

[75] Inventor: Shahid A. Siddiqui, Canton, Mich.

[73] Assignee: Automotive Systems Laboratory, Inc., Farmington Hills, Mich.

[21] Appl. No.: 747,753

[22] Filed: Nov. 13, 1996

[51] Int. Cl.[6] ............................................. B60R 21/26
[52] U.S. Cl. ............................. 280/740; 280/741; 55/485
[58] Field of Search ................................ 280/740, 736, 280/741, 742; 55/485, 487, 523; 102/530, 531

[56] References Cited

U.S. PATENT DOCUMENTS

| | | |
|---|---|---|
| 34,615 | 3/1862 | Shannon . |
| 2,529,791 | 11/1950 | Whitworth et al. . |
| 3,726,220 | 4/1973 | MacDonald et al. . |
| 3,733,180 | 5/1973 | Heineck et al. ................ 280/741 |
| 3,739,574 | 6/1973 | Godfrey . |
| 3,797,854 | 3/1974 | Poole et al. . |
| 3,972,545 | 8/1976 | Kirchoff et al. ................ 280/736 |
| 4,296,084 | 10/1981 | Adams et al. . |
| 4,414,902 | 11/1983 | Strasser et al. ................ 102/531 |
| 4,530,516 | 7/1985 | Adams et al. ................ 280/741 |
| 4,561,675 | 12/1985 | Adams et al. ................ 280/734 |
| 4,722,551 | 2/1988 | Adams ................ 280/736 |
| 5,005,486 | 4/1991 | Lenzen ................ 102/531 |
| 5,009,855 | 4/1991 | Nilsson ................ 422/164 |
| 5,033,390 | 7/1991 | Minert et al. ................ 102/530 |
| 5,048,862 | 9/1991 | Bender et al. ................ 280/736 |
| 5,062,367 | 11/1991 | Hayashi et al. ................ 102/530 |
| 5,345,875 | 9/1994 | Anderson ................ 102/530 |
| 5,397,543 | 3/1995 | Anderson ................ 422/165 |

*Primary Examiner*—Peter C. English
*Attorney, Agent, or Firm*—Lyon, P.C.

[57] ABSTRACT

A solid propellant gas generator incorporates staged gas cooling and filtration so as to generate cool, clean gasses having a composition suitable for use in an automobile airbag inflator. Ceramic foam balls are used as a primary heat sink within the filter thereby increasing the dimensional stability of the gas generator.

3 Claims, 1 Drawing Sheet

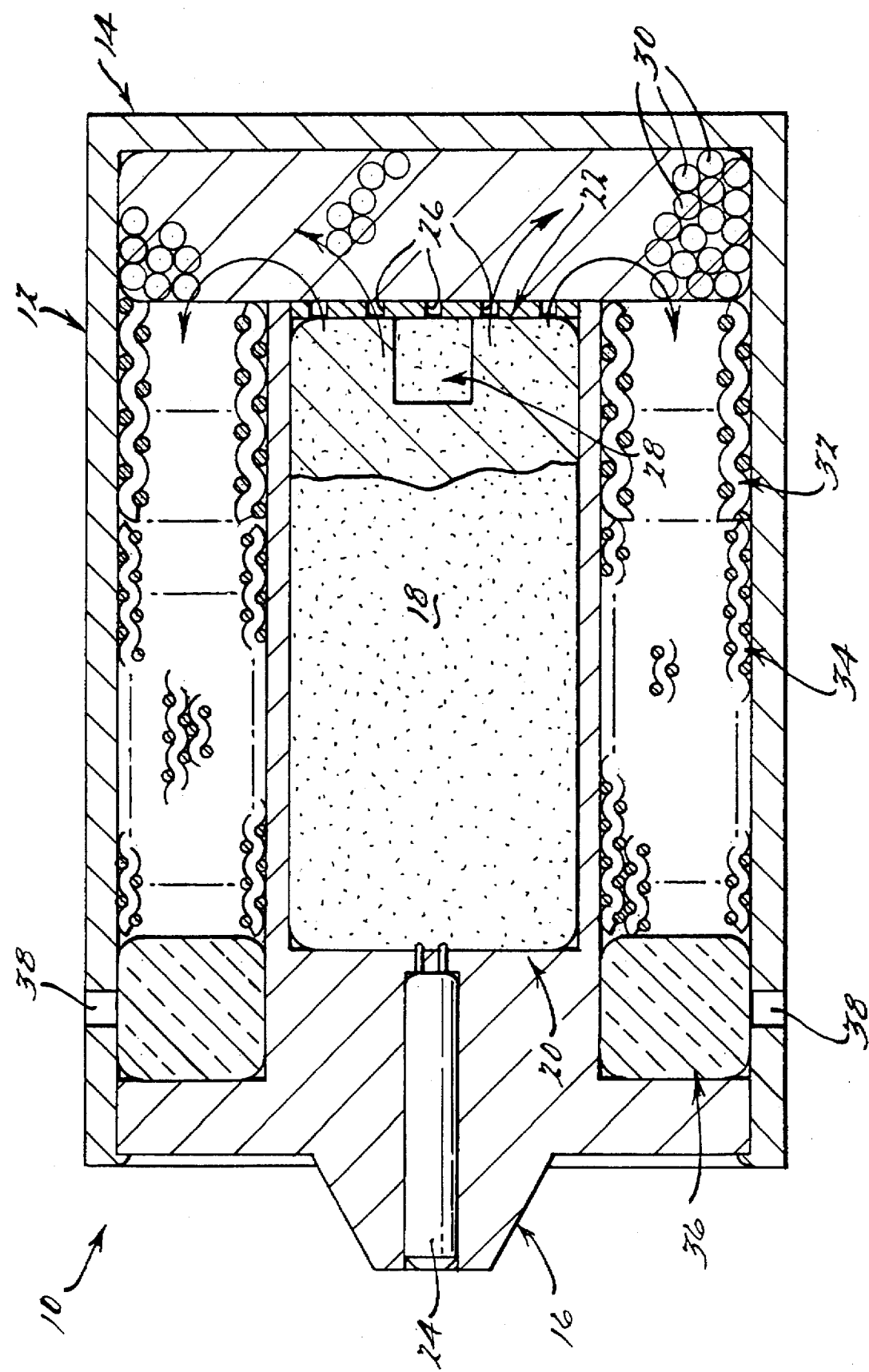

GAS INFLATOR WITH CERAMIC FOAM BALLS

BACKGROUND OF THE INVENTION

The present invention relates generally to gas inflators for automotive passenger restraint systems, and more specifically, to a gas filter for improved filtration of solids and cooling of combustion gasses.

The composition of the gas stream emanating from an automobile airbag inflator is subject to strict requirements to avoid toxicity concerns. Generally, solid propellant gas generators produce unacceptable byproducts which must be removed from the gas stream prior to exiting the gas generator. Due to the high temperatures involved in burning solid propellants, many of the unacceptable byproducts are in the form of liquids or gasses which are difficult to remove unless otherwise cooled to the point where the undesirable byproducts convert to solids, which can be filtered out, or to liquids, which solidify in contact with cool surfaces of the gas generator.

The conventional approach to solving the aforesaid problem has been to direct the hot propellant gasses directly into a coolant/filter mass and rapidly cool the gasses down in a single step to the point where the undesirable solid and liquid byproducts are removed. However, a problem is presented by this approach in that rapid cooling of the gasses may stabilize the gas combustion equilibrium in a manner that leads to unacceptably high levels of undesired gasses.

For example, in airbag inflators, low levels of NO and CO in the effluent gasses are mandated. When a stoichiometric propellant containing N, C and O is burned, the quantity of NO and CO produced is a function of the propellant combustion temperature. More CO and NO is formed at higher temperatures. If, as in a conventional system, the combustion gasses are quenched in a single step to a temperature at which the gas reaction rates are reduced to essentially zero, combustion will not go to completion and unacceptably high CO and NO levels, resulting from the combustion temperature equilibrium condition, may be produced.

Multistage filters that cool the gasses in stages have been designed to address the problems described. However, due to high temperatures, dimensional instability caused by burning and thermal shock is problematic with regard to current filtration designs.

SUMMARY OF THE INVENTION

The aforesaid problems are solved, in accordance with a preferred constructed embodiment of the present invention, by a multistaged filter comprising a ceramic foam ball bed, multiple layers of stainless steel mesh, and a ceramic filter. Ceramic foam balls are used as an initial filtration and cooling means thereby providing greater dimensional stability by significantly lowering the temperature of the combustion gasses prior to their introduction into the metal filters. With sufficient residence time between stages, the CO and NO equilibrium condition can be shifted to relatively low, acceptable, CO and NO concentrations.

BRIEF DESCRIPTION OF THE DRAWINGS

The drawing FIGURE is a cross-sectional view of a gas generator in accordance with the present invention.

DETAILED DESCRIPTION OF THE PREFERRED EMBODIMENT(S)

As seen in FIG. 1, a gas generator 10, constructed and assembled in a conventional manner as disclosed, by way of illustration, in co-owned and copending application No. 07/803,530 entitled "Gas Generator", and filed on Dec. 9, 1991, in accordance with an exemplary constructed embodiment of the invention, comprises a housing 12, for example, an aluminum forging. The housing 12 has an integral end closure 14 at one end, and an end closure 16 at the opposite end that is crimped in place. A perforated propellant chamber 18, having a proximal end 20 and a distal end 22, is centrally and longitudinally disposed within housing 12. The end closure 16 accepts an electric igniter 24 wherein the igniter 24 initiates combustion of the propellant grains within propellant chamber 18. A plurality of evenly spaced openings 26 are disposed at distal end 22 of propellant chamber 18. A burst foil may be provided along the inner edge of distal end 22 and over the apertures 26, thereby facilitating pressure buildup and flame front propagation through the propellant grains disposed internally of propellant chamber 18. A self-igniter 28 is also disposed within propellant chamber 18 at distal end 22, and functions as an auxiliary igniter.

In accordance with the present invention, a multistage filter system is formed from a set of individual filters laterally spaced along a longitudinal axis of the gas generator 10. In accordance with a preferred embodiment, the first filter stage comprises a bed of ceramic foam balls 30, for example, Duocel$^R$ Ceramic Foam, obtainable from Energy Research and Development Corporation, Oakland, Calif., forming a lateral filtration band between integral end 14 and distal end 22. The ceramic balls 30 act as a heat sink which increases dimensional stability by initial cooling and filtration of hot gasses. A second filter stage comprises a wound expanded metal filter 32 having large stainless steel 16 mesh wire made from wire having a diameter of 0.016 in. ($\approx$0.04 cm.). Metal filter 32 extends radially outward from the propellant chamber 18 to the housing 12, and forms a second lateral band immediately adjacent to the ceramic foam balls 30. A third filter stage comprises a second wound expanded metal filter 34 formed from stainless steel 20 mesh wire made from a wire having a diameter of 0.032 in.($\approx$0.08 cm.). The metal filter 34 extends radially outward from the propellant chamber 18 to the housing 12, and forms a third lateral band immediately adjacent to the filter The final filter stage comprises a fine ceramic filter 36, disposed about end closure 16 and proximal end 20, and extends radially outward from the propellant chamber 18 to the housing 12, forming a fourth lateral band immediately adjacent to filter 34. A plurality of discharge nozzles 38 extend from the ceramic filter 36 through the housing 12. While a specific example has been described with respect to filters 30, 32, 34, and 36, one skilled in the art will readily appreciate that numerous design permutations are possible without departing from the objects of the present invention.

In operation, as denoted by the directional arrows in FIG. 1, upon combustion of the propellant, gasses exiting from the propellant tube 18 flow through the apertures 26 therein, and are substantially cooled as they radially pass through the ceramic foam balls 30 and enter filter 32. The gasses then flow longitudinally and circumferentially through filter 32 and then through filter 34. Both liquids and solids in the gas stream are deposited, or filtered, on the wound metal mesh of filters 32 and 34. The gas stream is also further cooled as it travels through filters 32 and 34. Thereafter, the gasses flow into ceramic filter 36 for final cooling and filtration, and then radially exit the generator through nozzles 38.

While the preferred embodiment of the invention has been disclosed, it should be appreciated that the invention is susceptible of modification without departing from the scope of the following claims.

I claim:

1. A gas generator comprising:

a housing having a plurality of gas discharge nozzles;

a propellant chamber located within said housing for holding a propellant charge, said chamber having a plurality of apertures which are in fluid communication with said plurality of gas discharge nozzles;

means for igniting said propellant charge; and a multistage filter in fluid communication with said plurality of apertures and said plurality of gas discharge nozzles, said multistage filter comprising:

a first filtration stage comprising a bed of ceramic foam balls;

a second filtration stage comprising a first wire mesh metallic filter;

a third filtration stage comprising a second wire mesh metallic filter; and a fourth filtration stage comprising a ceramic filter, wherein gasses produced by ignition of said propellant charge flow through said plurality of apertures into said ceramic foam balls for cooling thereof, thence through said first wire mesh metallic filter, thence through said second wire mesh metallic filter, and thence through said ceramic filter and outward through said discharge nozzles in said generator housing.

2. A gas generator as claimed in claim 1 further comprising a self-igniter within said propellant chamber.

3. A gas generator as claimed in claim 1 further comprising a burst foil positioned within said chamber, covering said apertures of said propellant chamber.

* * * * *